No. 847,099. PATENTED MAR. 12, 1907.
E. A. NELSON.
SPRING WHEEL.
APPLICATION FILED NOV. 26, 1906.
2 SHEETS—SHEET 1.
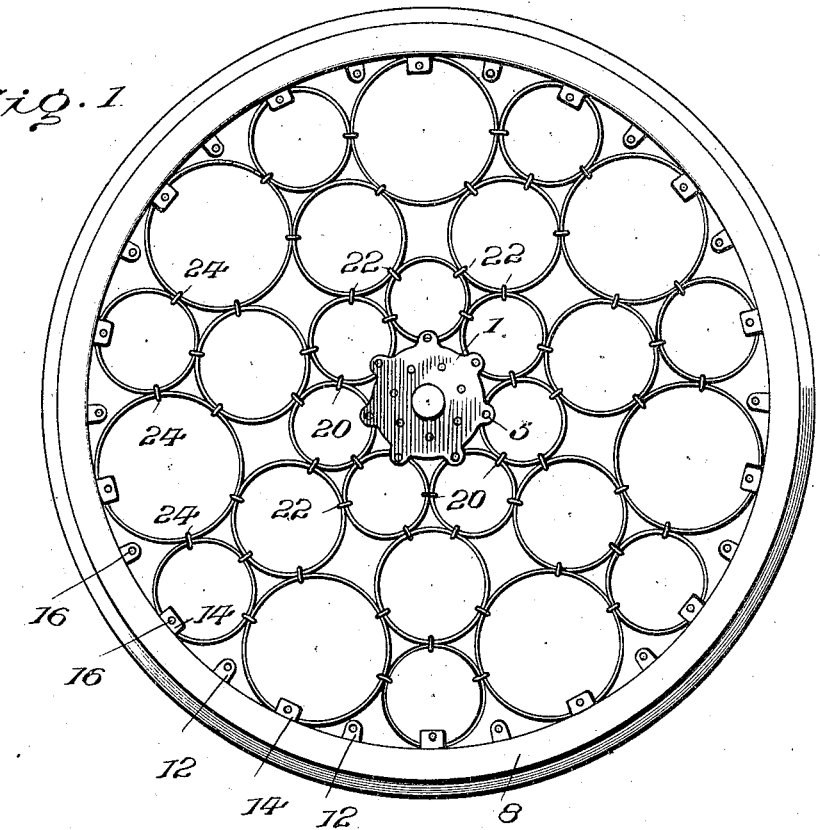
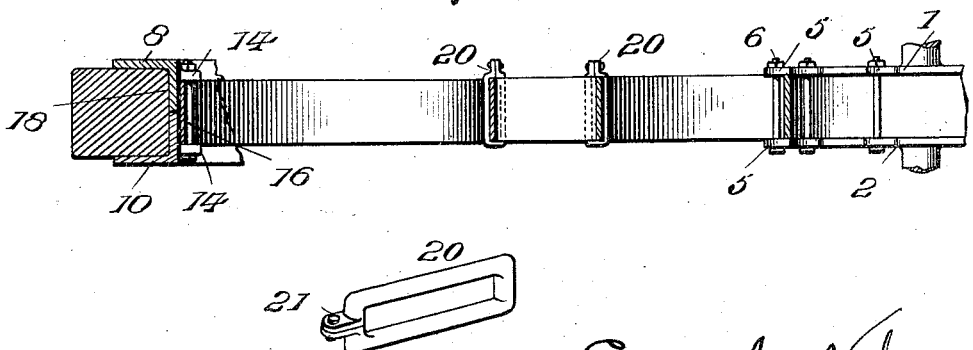
Witnesses
L. H. Schmidt
Inventor
Elon A Nelson
By Robertson & Johnson
Attorneys No. 847,099. PATENTED MAR. 12, 1907.
E. A. NELSON.
SPRING WHEEL.
APPLICATION FILED NOV. 26, 1906.
2 SHEETS—SHEET 2.
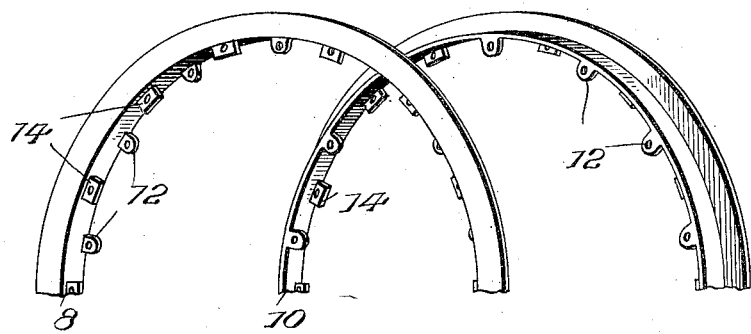
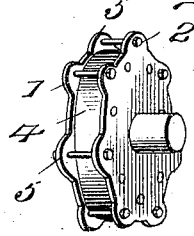
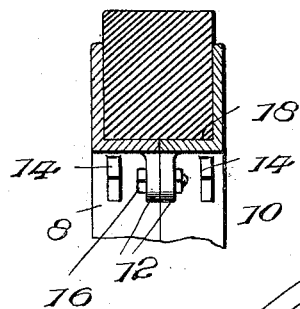
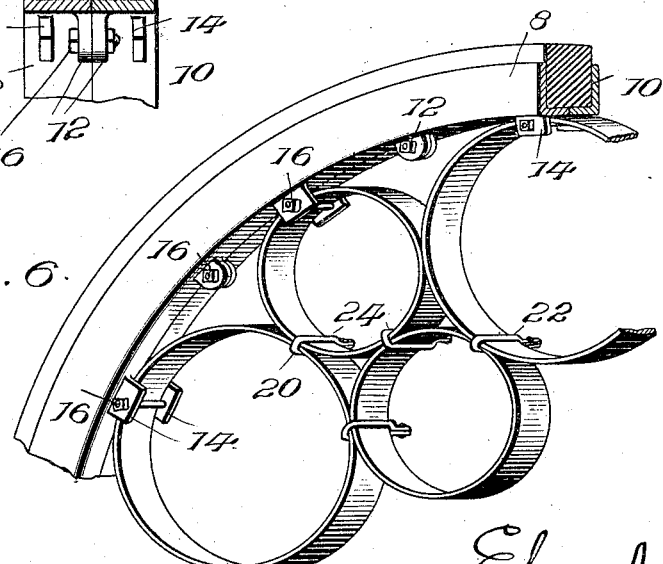
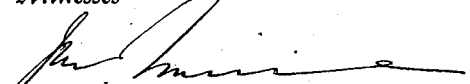

UNITED STATES PATENT OFFICE.

ELON A. NELSON, OF CHICAGO, ILLINOIS.

SPRING-WHEEL.

No. 847,099.   Specification of Letters Patent.   Patented March 12, 1907.

Application filed November 26, 1906. Serial No. 345,256.

*To all whom it may concern:*

Be it known that I, ELON A. NELSON, a citizen of the United States, and a resident of Chicago, county of Cook, State of Illinois, have invented certain new and useful Improvements in Spring-Wheels, of which the following is a specification.

This invention relates to spring-wheels of that type in which the resilience is obtained by means of springs located between the hub and the rim of the wheel; and the object of my invention is to provide a wheel of this character in which the springs will yield radially and while resisting all other strains tending to displace the hub from its proper position relative to the rim will permit a very slight though almost inappreciable rotary movement of the hub with respect to the wheel to absorb such shocks as are given to the driving-wheels of automobiles. I accomplish this by constructing the wheel with a plurality of series of rings located between the rim and the hub, these rings being connected together so as to form an almost rigid structure and at the same time to yield under the undue strains to which said wheels are subjected.

In its preferable embodiment the wheel comprises a series of seven rings secured to the hub and to each other, an outside series of fourteen rings connected to each other and to the rim, and a series of seven rings interposed between the rings connected to the hub and the rings connected to the rim and secured to both sets of rings.

My invention therefore consists in the wheel shown in its preferable embodiment in the accompanying drawing and which will now be hereinafter more particularly described and then definitely claimed.

In the drawings accompanying this application, Figure 1 is a side elevation of a wheel constructed in accordance with my invention. Fig. 2 is a horizontal section of part thereof. Fig. 3 is a perspective view of one of the loops for securing the rings together. Fig. 4 is a detail perspective of parts of the rim separated, showing the ears or lugs. Fig. 5 is an enlarged detail section view through the rim and tire. Fig. 6 is an enlarged detail perspective of a portion of the wheel. Fig. 7 is a detail perspective of the hub.

Referring now to the details of the drawings by numerals, the hub of my wheel consists of two side plates 1 and 2, fixedly secured to a central portion 4, the plates 1 and 2 having ears 5, through which are passed bolts, all as clearly seen in Fig. 7. The rim of my wheel is formed of two sections, (designated by the numerals 8 and 10,) these sections being preferably of endless angle-iron and each section being provided with two sets of lugs or ears 12 and 14, the lugs 12 being on the inside and the lugs 14 near the outside. The lugs or ears 12 form means by which the two sections 8 and 10 may be bolted or riveted together, as indicated at 16. It will be noticed that the lugs or ears 12 and 14 alternate, so as not to interfere with each other, and at the same time permit the bolts or rivets to pass from the ears 14 on opposite sides of the rim for the purpose of securing rings between the ears 14, as will be hereinafter described, and when these rims are secured together they form a seat for a rubber tire, as indicated at 18.

Between the rim formed of the sections 8 and 10 and the hub formed of the plates 1 and 2 are secured a plurality of series of rings which are graduated in size, the smaller ones being around the hub and the largest ones around the rim. As illustrated, there are seven rings, which in practice I prefer to have about two inches in diameter and from one-eighth to one-sixteenth of an inch thick, and these rings snugly fit between the ears 5, forming parts of the hub-plates 1 and 2, to which they are secured by the bolts 6. These rings are also secured to each other by special loops 20, which are formed of spring material, so as to slip over the adjoining sections of the rings, and the ends are riveted or bolted together, as seen at 21. Around this series of rings is secured a larger series of rings, also seven in number, and each of these rings is secured to two of the aforesaid rings by means of loops 22, similar to the loops 20 already described. This series of rings, however, is secured only to the smaller rings, and the individual rings of this series are not secured to each other. Around this second series of rings and interposed between them and the rim is a third series of rings, this third series comprising large rings, between each two of which is a ring of about the size of those of the second series. The rings of this third set are all secured to each other where they touch each other and also to the second series of rings by means of loops 24, similar to those before described, and the outer sides of this series of rings are also secured between the lugs 14 of the sections 8 and 10 of the rim by means of the bolts 16. I desire to call particular attention to the shape of the loops which are employed for the purpose of securing the adjacent sections of the rings together. It will be noted that these loops are of cylindrical shape where they contact with the flat sides of the rings, and this while insuring a proper connection between the rings will yet permit them to "give" to the slight extent necessary in this character of wheel.

My improved wheel is so simple that no description of its operation seems at all necessary except to state that since there are six rings between the top and bottom of the rim and the hub each ring yields a little in absorbing a shock, and thus the same shock which is absorbed by the tread portion alone of a pneumatic tire is distributed through a number of rings. As a matter of fact some resilience is given by practically all the rings within the wheel; but there are at least six rings always in a position to absorb the greatest part of the strain, and since these six or more rings are firmly secured to and reinforced by the other rings a wheel is provided which gives a maximum of rigidity while at the same time permitting that resilience which is so necessary in wheels for use on self-propelled vehicles.

What I claim as new is—

1. In a wheel, the combination of a hub and a rim, a series of spring-rings secured to said hub, a series of spring-rings secured to said rim, and a series of spring-rings secured to both series of the aforesaid rings, substantially as described.

2. In a wheel, the combination of a hub and a rim, a series of spring-rings secured to said hub, a series of spring-rings secured to said rim, and a series of spring-rings secured to both series of the aforesaid rings, the said rings being graduated in size with the smallest rings next to the hub and the largest rings next to the rim, substantially as described.

3. In a wheel, the combination of a hub and a rim, a series of spring-rings surrounding said hub and connected thereto and to each other, a series of rings within the rim and connected thereto, and a third series of rings between the rings connected with the hub and the rings connected with the rim and connected to both sets of said rings, substantially as described.

4. In a wheel, the combination of a hub and a rim, a series of spring-rings of relatively small size surrounding said hub and connected thereto, a series of larger rings around the rings connected with the hub and connected thereto, and a series of still larger rings interposed between the second series of rings and the rim and connected both to said rings and to the rim, substantially as described.

5. In a wheel, the combination with a hub and a rim of a plurality of spring-rings of relatively small size surrounding the hub and connected therewith, a series of larger rings connected to the first set of rings, and a third set of rings connected to the second set of rings and to the rim, this third set of rings comprising a set of rings larger than the second set having smaller rings interposed between them, substantially as described.

6. In a wheel, the combination of a hub, a rim formed of two sections having ears or lugs, and spring-rings interposed between the hub and the rim, the ears or lugs on the rim forming a means connecting the rings to the rim, substantially as described.

7. In a wheel, the combination of a hub and a rim, a plurality of series of spring-rings located between the hub and the rim, the said rim being formed in sections each section having a flange on its exterior and ears or lugs on the interior, the flanges forming a retaining means for the tire and the lugs a retaining means for the spring-rings, substantially as described.

8. In a wheel, the combination with a hub and a rim, of a plurality of spring-rings located between the hub and the rim, the said rim being formed in sections and having flanges and two sets of ears or lugs, the flanges acting to retain the tire in position, and one set of lugs to secure the sections of the rims together, and the other set of lugs to hold the rings in place, substantially as described.

9. In a wheel, the combination with a hub and a rim, of a plurality of series of spring-rings located between the hub and the rim and loops connecting the rings together, said loops being rounded where they contact with the flat sides of the spring-rings, substantially as described.

Signed by me at Washington, District of Columbia, this 24th day of November, 1906.

ELON A. NELSON.

Witnesses:
 THOS. E. ROBERTSON,
 ARTHUR E. DOWELL.